United States Patent
Kanchana et al.

(10) Patent No.: US 11,138,111 B2
(45) Date of Patent: Oct. 5, 2021

(54) PARALLEL COHERENCE AND MEMORY CACHE PROCESSING PIPELINES

(71) Applicant: Apple Inc., Cupertino, CA (US)

(72) Inventors: Muditha Kanchana, San Jose, CA (US); Srinivasa Rangan Sridharan, San Jose, CA (US); Harshavardhan Kaushikkar, San Jose, CA (US); Sridhar Kotha, San Jose, CA (US); Brian P. Lilly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 16/129,527

(22) Filed: Sep. 12, 2018

(65) Prior Publication Data
US 2020/0081838 A1 Mar. 12, 2020

(51) Int. Cl.
*G06F 12/0815* (2016.01)
*G06F 12/0884* (2016.01)
*G06F 12/0855* (2016.01)

(52) U.S. Cl.
CPC ...... *G06F 12/0815* (2013.01); *G06F 12/0855* (2013.01); *G06F 12/0884* (2013.01); *G06F 2212/1032* (2013.01); *G06F 2212/621* (2013.01)

(58) Field of Classification Search
CPC ............. G06F 12/0815; G06F 12/0855; G06F 12/0884; G06F 2212/1032; G06F 2212/621
See application file for complete search history.

(56) References Cited

U.S. PATENT DOCUMENTS

| | | | |
|---|---|---|---|
| 4,622,631 A * | 11/1986 | Frank | G06F 12/0815 |
| 6,636,949 B2 | 10/2003 | Barroso et al. | |
| 6,675,265 B2 | 1/2004 | Barroso et al. | |
| 8,904,073 B2 | 12/2014 | Kaushikkar | |
| 9,003,163 B2 | 4/2015 | Koka et al. | |
| 9,823,730 B2 | 11/2017 | Kanchana et al. | |
| 2013/0254488 A1 | 9/2013 | Kaxiras et al. | |
| 2015/0006803 A1* | 1/2015 | Kaushikkar | G06F 12/0815 |
| | | | 711/104 |
| 2015/0143044 A1* | 5/2015 | Gulati | G06F 12/0802 |
| | | | 711/121 |
| 2017/0109280 A1 | 4/2017 | Offen et al. | |

* cited by examiner

*Primary Examiner* — David Yi
*Assistant Examiner* — Dustin B. Fulford
(74) *Attorney, Agent, or Firm* — Rory D. Rankin; Kowert, Hood, Munyon, Rankin & Goetzel, P.C (57) ABSTRACT

Systems, apparatuses, and methods for performing coherence processing and memory cache processing in parallel are disclosed. A system includes a communication fabric and a plurality of dual-processing pipelines. Each dual-processing pipeline includes a coherence processing pipeline and a memory cache processing pipeline. The communication fabric forwards a transaction to a given dual-processing pipeline, with the communication fabric selecting the given dual-processing pipeline, from the plurality of dual-processing pipelines, based on a hash of the address of the transaction. The given dual-processing pipeline performs a duplicate tag lookup in parallel with a memory cache tag lookup for the transaction. By performing the duplicate tag lookup and the memory cache tag lookup in a parallel fashion rather than in a serial fashion, latency and power consumption are reduced while performance is enhanced.

20 Claims, 10 Drawing Sheets

PARALLEL COHERENCE AND MEMORY CACHE PROCESSING PIPELINES

BACKGROUND

Technical Field

Embodiments described herein relate to computing systems, and more particularly, processing memory transactions.

Description of the Related Art

Integrated circuits (ICs) often include multiple circuits or agents that have a need to communicate with each other and/or access data stored in memory. In many cases, agents may communicate through various addresses defined in a common memory map or address space. In multiprocessor ICs, and even in single processor ICs in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement). Because the updates have not been made to main memory at the time the updates are made in cache, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherence is increasingly challenging as different agents are accessing the same regions of memory.

In addition to including logic for performing cache coherence operations, computing systems also include communication fabrics for routing transactions to and from memory. Many communication fabrics use a system of interconnected fabric units to arbitrate, aggregate, and/or route packets of messages between different processing elements. For example, some fabrics may use a hierarchical tree structure and process messages at each level in the tree. The processing performed at each level may include arbitration among packets from different processing elements, aggregating of packets belonging to the same message, operations to maintain memory coherence, etc. Communications fabrics are often used in system-on-a-chip (SoC) designs that are found in mobile devices such as cellular phones, wearable devices, etc., where power consumption and performance are important design considerations.

SUMMARY

Systems, apparatuses, and methods for performing coherence processing and memory cache processing in parallel are contemplated.

In one embodiment, a system includes a communication fabric and a plurality of dual-processing pipelines. Each dual-processing pipeline includes a coherence processing pipeline and a memory cache processing pipeline. The communication fabric forwards a transaction to a given dual-processing pipeline, with the communication fabric selecting the given dual-processing pipeline based on a hash of the address of the transaction. The given dual-processing pipeline performs a duplicate tag lookup in parallel with a memory cache tag lookup for the transaction. By performing the duplicate tag lookup and the memory cache tag lookup in a parallel fashion rather than in a serial fashion, latency and power consumption are reduced while performance is enhanced.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a communication fabric . . . ." Such a claim does not foreclose the system from including additional components (e.g., a processor, a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

As used herein, a "memory transaction" or simply "transaction" refers to a command or request to read, write, or modify content (e.g., data or instructions) stored in a memory location corresponding to a particular address. In various embodiments, the address may be provided as a logical address, a physical address, or either. It is noted that throughout this disclosure, transactions may also be referred to as "memory requests", "memory access operations", or "memory operations", which are a type of instruction operation. In various embodiments, memory operations may be implicitly specified by an instruction having a memory operation, or may be derived from explicit load/store instructions.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 1:
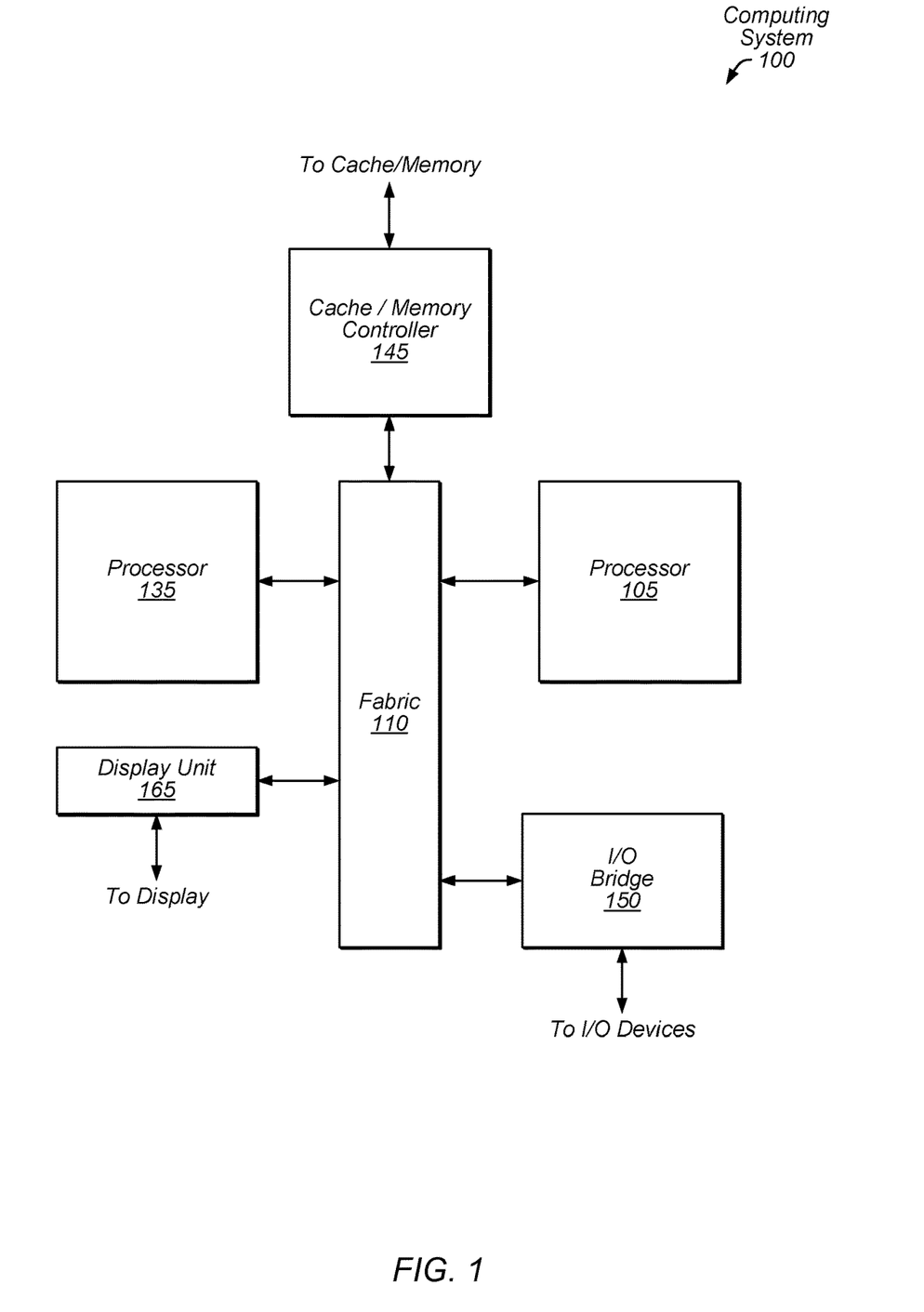
FIG. 1 is a block diagram illustrating one embodiment of a computing system.

Referring now to FIG. 1, a block diagram illustrating one embodiment of a computing system 100. In some embodiments, some or all elements of the computing system 100 may be included within an integrated circuit (IC) or a system on a chip (SoC). In some embodiments, computing system 100 may be included in a mobile device. In the illustrated embodiment, the computing system 100 includes fabric 110, processors 105 and 135, input/output (I/O) bridge 150, cache/memory controller 145, and display unit 165.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

Depending on the embodiment, each of processors 105 and 135 may include various numbers of cores and/or caches. For example, processors 105 and 135 may include 1, 2, or 4 processor cores, or any other suitable number. In some embodiments, processors 105 and 135 may include internal instruction and/or data caches. Processors 105 and 135 are coupled to fabric 110, and processors 105 and 135 may access system memory via cache/memory controller 145. In one embodiment, processor 105 and 135 are coherent agents of system 100. In some embodiments, a coherence unit (not shown) in fabric 110 or elsewhere in computing system 100 may be configured to maintain coherence between various caches of computing system 100. Processors 105 and 135 are configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, low-power always-on functionality, and/or other functions. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
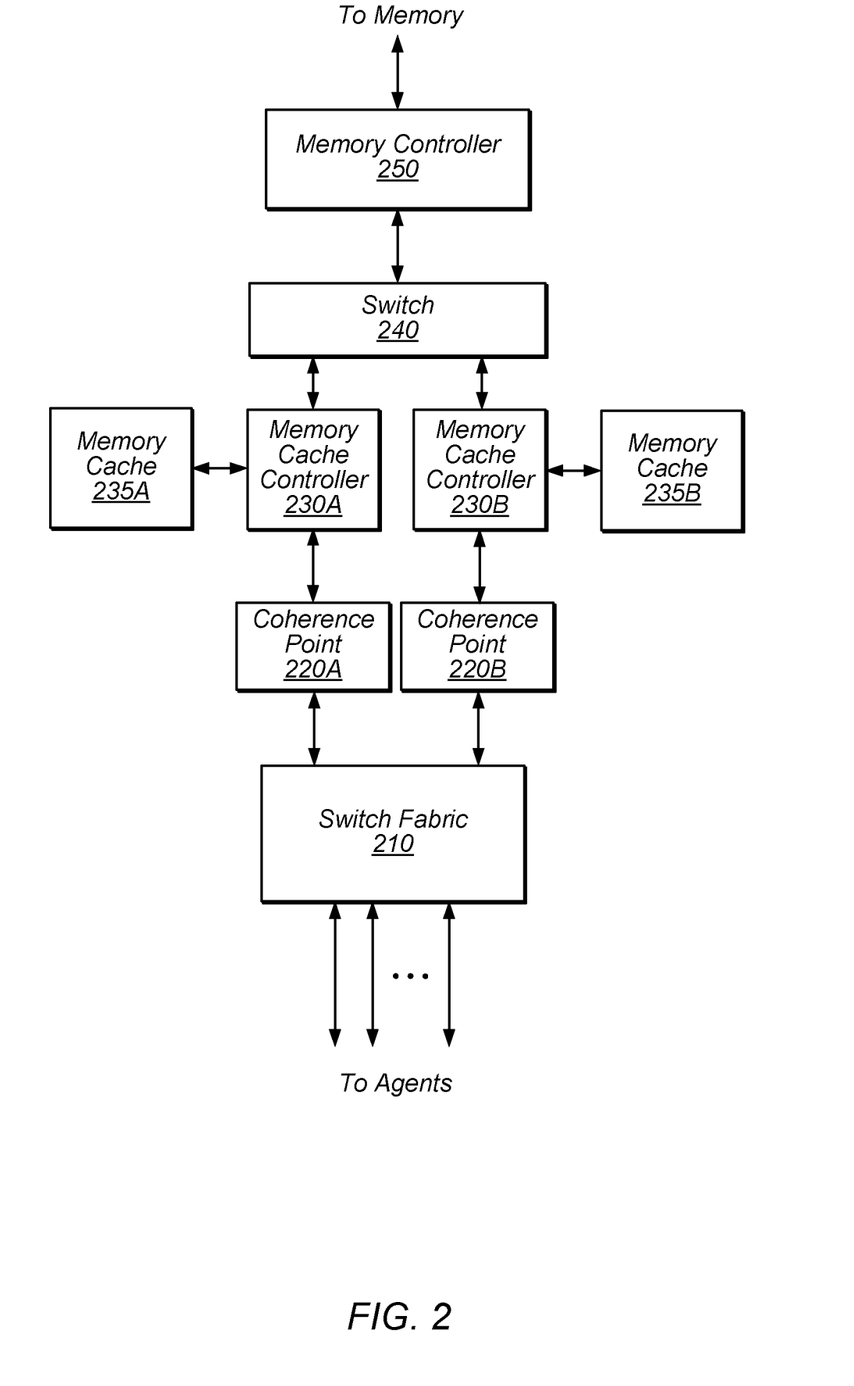
FIG. 2 is a block diagram of one embodiment of a fabric path to memory.

Turning now to FIG. 2, a block diagram of one embodiment of a fabric path to memory is shown. In one embodiment, the fabric path to memory is part of a computing system (e.g., computing system 100 of FIG. 1). The computing system has any number of functional units (i.e., agents) which are coupled to switch fabric 210. The number and type of functional units varies according to the embodiment. These functional units generate transactions which are conveyed to switch fabric 210 on any number of input legs. The transactions pass through switch fabric 210 to one of coherence points 220A-B. In one embodiment, the coherence point 220A-B which a transaction is sent to is based on an address targeted by the transaction.

In one embodiment, each of coherence points 220A-B performs various operations so as to maintain memory coherence among various cache and/or memory structures of the overall computing system. As used herein, the term "coherence point" is intended to be construed according to its well-known meaning, which includes a processing element configured to maintain cache coherence between caches and/or memories in a shared memory system. After coherence operations are performed by a given coherence point 220A-B for a transaction, the transaction is conveyed to a corresponding memory cache controller 230A-B. In one embodiment, "coherence operations" are defined as performing lookups of a duplicate tag structure, generating and sending probes to one or more caches in the computer system to determine if the caches have a copy of a block of data and optionally to indicate the state into which the cache should place the block of data, processing responses to probes, and/or one or more other operations.

Some memory transactions may be fulfilled by accessing a main system memory or a storage device. In some computing systems, the amount of time required to read/write data from/to the main system memory or the storage device may be longer than an execution time of several processor instructions. To enable faster access to frequently accessed content, issued memory transactions are sent to a memory cache controller 230A-B which may provide faster fulfillment of the memory transactions by storing content from frequently accessed memory locations in a memory cache 235A-B, respectively, that can be read and written faster than the main system memory or the storage device. After receiving a memory transaction, memory cache controller 230A-B determines if an address included in the memory transaction corresponds to an address currently stored in memory cache 235A-B, respectively. If the corresponding address for the memory transaction is currently stored in memory cache 235A-B, then memory cache controller 230A-B performs the transaction on a cached copy of requested content. Otherwise, if the address included in the memory transaction is not currently stored in the memory cache 235A-B, then memory cache controller 230A-B issues a command to retrieve data at the address included in the memory command. This command is conveyed to switch 240 and then to memory controller 250. Memory controller 250 is representative of any number of memory controllers which are connected to memory device(s) (not shown) via any number of memory channels.

Figure 3:
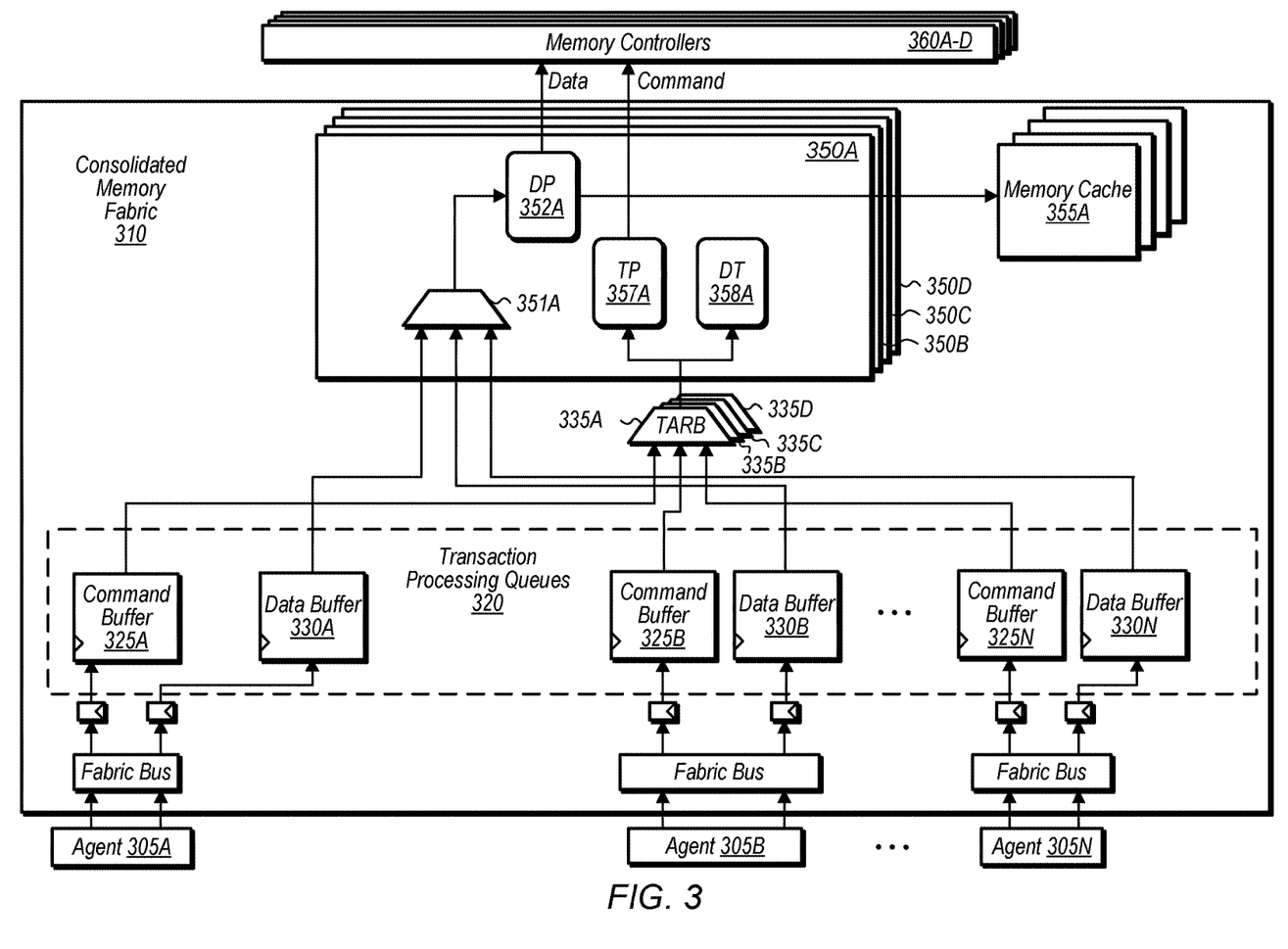
FIG. 3 is a block diagram of one embodiment of a consolidated memory fabric.

Referring now to FIG. 3, a block diagram of one embodiment of a consolidated memory fabric 310 is shown. In one embodiment, consolidated memory fabric 310 includes transaction processing queues 320, tag arbiters 335A-D, combined coherence point and memory cache controller units 350A-D, and memory caches 355A-D. Consolidated memory fabric 310 is coupled to agents 305A and memory controllers 360A-D. In other embodiments, consolidated memory fabric 310 includes other components and/or is arranged in other suitable manners. It is noted that "consolidated memory fabric" 310 may also be referred to as a "communication fabric" herein.

Agents 305A-N are representative of any number and type of agents. For example, in various embodiments, agents 305A-N include a CPU, a GPU, an I/O device, a system management unit, and/or other types of agents. Agents 305A-N send transactions upstream to memory through fabric bus components and flops to transaction processing queues 320. In one embodiment, there is a separate command buffer 325A-N and data buffer 330A-N pair for each agent 305A-N, respectively. In various embodiments, an entry in command buffers 325A-N may include a value representing a memory command, an address or addresses for the command (either logical or physical address), a value representing a priority of the transaction, a value representing an age or length of time since the transaction was issued, and/or any other suitable values that may be used in the processing of the transaction.

In one embodiment, the memory bandwidth of the overall computing system is divided into multiple memory pipelines (i.e., multiple distinct processing paths) such that each has its own memory controller and can be accessed independently of other memories. For example, in one embodiment, each memory and corresponding memory pipeline may be assigned a portion of an address space. Alternatively, a memory and corresponding memory pipeline may be assigned data based on load balancing or other considerations. In one embodiment, the memory pipeline that a transaction traverses is selected based on a hash function applied to at least a portion of the transaction address. In such an embodiment, some form of mapping between memories and address hashes may be maintained. In the embodiment shown in FIG. 3, computing system 300 includes four pipelines 350A-D. However, it should be understood that in other embodiments, computing system 300 may include other numbers of pipelines.

In one embodiment, consolidated memory fabric 310 includes a common arbitration point represented by tag arbiters 335A-D. For each pipeline, a given tag arbiter 335A-D selects a transaction from transaction processing queues 320 to forward to a corresponding combined coherence point and memory cache controller unit 350A-D. It is noted that tag arbiters 335A-D arbitrate across all of the transaction processing queues 320. In other words, tag arbiters 335A-D represent a common arbitration point across all transaction processing queues 320.

Transaction processing queues 320 include any number of queues, with the number varying according to the embodiment. Each transaction processing queue 320 includes a command buffer 325A-N and data buffer 330A-N, respectively, with each buffer including a plurality of entries. As used herein, the term "queue" refers to a storage element having a plurality of entries. Queues are often used to store data (e.g., data associated with transactions) while waiting for processing resources to become available or for particular events to occur. In some embodiments, queues are used to store transactions in program order even though the transactions may be performed out of program order. Thus, queues do not always behave in a first-in-first-out (FIFO) manner. For example, if transactions arrive out of program order but are removed in program order, the transactions may not be dequeued (or retired) in the same order in which they are enqueued. As used herein, the term "storage element" refers to any element configured to store one or more values in a volatile or non-volatile manner. Examples of storage elements include registers, memories, latches, disks, etc.

Tag arbiters 335A-D perform arbitration and then determine which transaction is ready to be sent to combined coherence point and memory cache controller units 350A-D, respectively, for processing. In one embodiment, each combined coherence point and memory cache controller unit 350A-D handles both coherence operations and a memory cache lookup. It is noted that combined coherence point and memory cache controller units 350A-D may also be referred to as combined coherence point and memory cache controller pipelines, dual-processing pipelines, or pipelines for short. In one embodiment, each tag arbiter 335A-D feeds into (i.e., supplies) a single pipeline 350A-D per memory channel. Also, each pipeline 350A-D feeds into a respective memory channel.

In one embodiment, pipeline 350A includes multiplexer 351A, data path 352A, tag pipeline 357A, and duplicate tag pipeline 358A. The other combined coherence point and memory cache controller units 350B-D have similar circuitry. Multiplexer 351A feeds data path 352A with data from a corresponding data buffer 330A-N once the pipeline has finished processing the transaction. Tag pipeline 357A includes circuitry for performing a lookup of the tags of memory cache 355A while duplicate tag pipeline 358A includes circuitry for performing a duplicate tag lookup for coherence purposes. Memory cache 355A stores recently accessed data from memory for a first memory channel, while duplicate tag pipeline 358A include tags, corresponding to the first memory channel, of cache lines stored in other caches of the computing system. In one embodiment, the lookup of memory cache tags is performed in parallel with the lookup of duplicate tag pipeline 358A. The architecture of consolidated memory fabric 310 is a consolidation (or "unification"), into a single logical block, of the hierarchy which was presented in FIG. 2, including the switch fabric, coherence point, memory cache controller, memory caches, and memory controller switch. Other embodiments may include other and/or different components in a single consolidation.

In addition to the above, the unified structure of the consolidated memory fabric 310 allows virtual channel separation to be carried all the way up to memory controllers 360A-D. In the hierarchy shown in FIG. 2, virtual channels are terminated at the output of switch fabric 210. The separated switch fabric, coherence point, and memory cache controller pipelines of FIG. 2 do not allow for the full support of virtual channel separation. Many scenarios result in unnecessary hazarding and blocking in the architecture of FIG. 2. In comparison, consolidated memory fabric 310 facilitates virtual channel separation all the way to memory by avoiding needless hazards across independent virtual channels while at the same time correctly handling cases where address hazarding is required for data consistency. Also, the unified structure, fabric arbitration, and combined coherence and memory cache processing makes the virtual channel aware resource management more efficient since there is only one point in the processing path where address hazards and resource requirements are resolved. In the architecture of FIG. 2, multiple pipelines may work out of sync with each other as the first entity in a processing path may not have visibility into the availability of resources, or hazards, upstream in a subsequent entity in the processing path. Hence, the first entity in the architecture of FIG. 2 has difficulty reacting to and/or shaping traffic appropriately.

Figure 4:
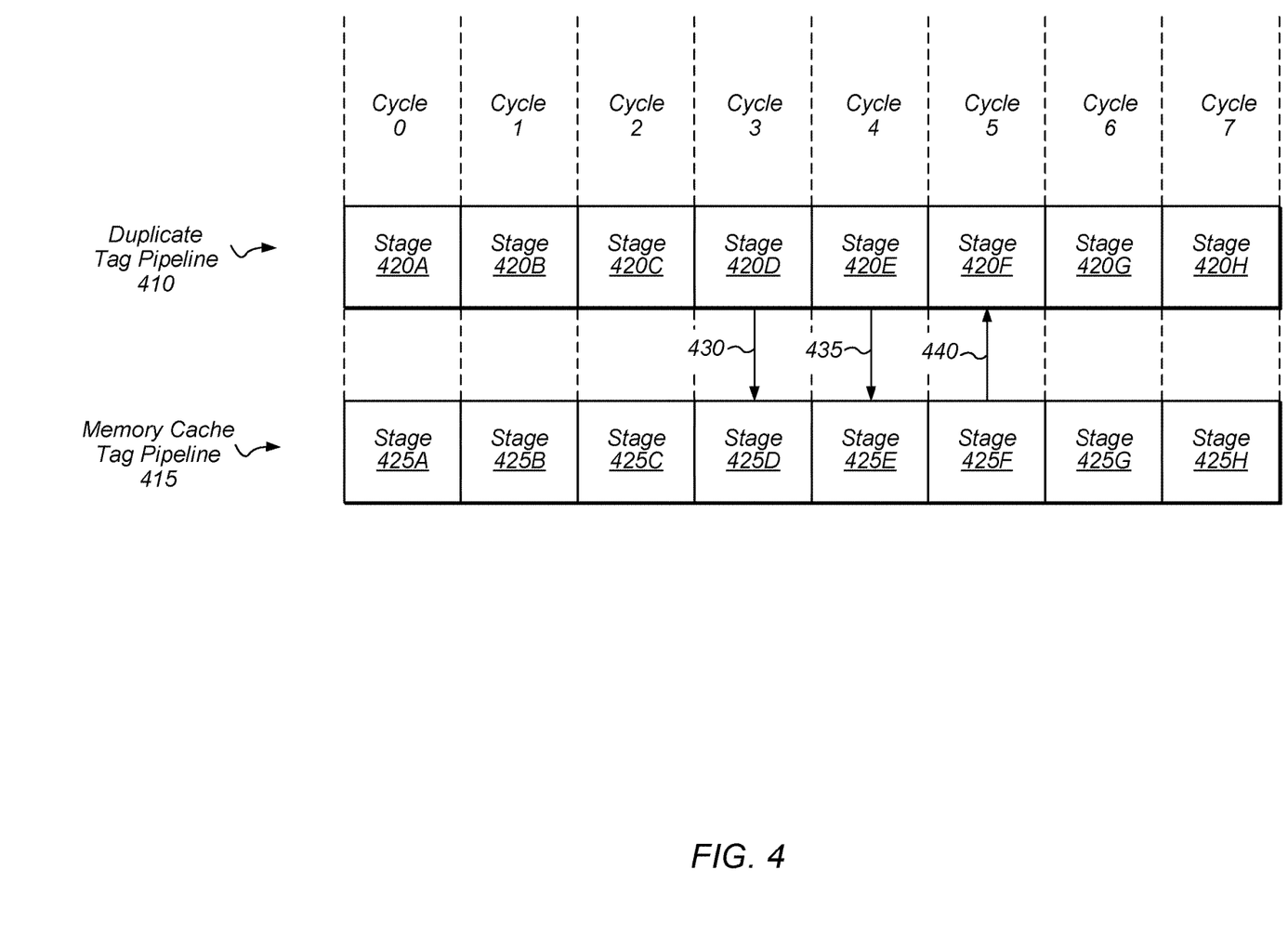
FIG. 4 is a diagram of one embodiment of a duplicate tag pipeline in parallel with a memory cache tag pipeline.

Turning now to FIG. 4, a diagram of one embodiment of a duplicate tag pipeline 410 in parallel with a memory cache tag pipeline 415 is shown. It is noted that the terms "duplicate tag pipeline" and "coherence processing pipeline" may be used interchangeably herein. It is also noted that the terms "memory cache tag pipeline" and "memory cache processing pipeline" may be used interchangeably herein. In one embodiment, duplicate tag pipeline 410 and memory cache tag pipeline 415 are part of a combined coherence point and memory cache controller pipeline (e.g., combined coherence point and memory cache controller pipeline 350A of FIG. 3). In this embodiment, when a transaction is received by the combined coherence point and memory cache controller pipeline, the transaction is processed in parallel by the duplicate tag pipeline 410 and memory cache tag pipeline 415.

In one embodiment, during stage 420A of duplicate tag pipeline 410, a lookup is initiated to the duplicate tag and state memories for the tag of the incoming transaction address. In stages 420B-C, the lookup process of the duplicate tag and state memories continues. It is noted that in other embodiments, other numbers of stages are allocated for the lookup of the duplicate tag and state memories. In stage 420D, a hit or miss status is determined for the lookup. Also during stage 420D, notification 430 is generated by duplicate tag pipeline 410 and sent to memory cache tag pipeline 415. In one embodiment, notification 430 includes the hit/miss status and lock information from the lookup to the tag memory and state memory, respectively. The lock information specifies if a matching entry is currently locked by an older transaction to the same address.

In stage 420E, a new state and a new tag for the transaction are generated and stored in flops. Also, a notification 435 is sent to memory cache tag pipeline 415 in stage 420E. In one embodiment, notification 435 is a snoop hint to indicate which snoop requests will be sent. Additionally, in one embodiment, notification 435 also includes an indication which specifies whether duplicate tag pipeline 410 is going to lock the cache line if memory cache tag pipeline 415 indicates that the transaction has passed the global ordering point. In stage 420F, the new state and tag values generated and stored in flops in stage 420E are pipelined. During stage 420F, duplicate tag pipeline 410 receives notification 440 from memory cache tag pipeline 415 which indicates if the transaction has crossed the global ordering point. As used herein, the term "global ordering point" is defined as the point in the system beyond which all operations are ordered with respect to each other. When a transaction crosses the global ordering point, the effect of the transaction is visible across the entire system. In one embodiment, the global ordering point is located at the end of memory cache tag pipeline 415.

In stage 420G, if the notification 460 received from memory cache tag pipeline 415 indicates that the transaction has crossed the global ordering point, then the tag and state memories are written with the transaction's new tag and state values. Otherwise, if the notification 460 received from memory cache tag pipeline 415 indicates that the transaction has not crossed the global ordering point, then the updates to the tag and state memories are delayed. Stage 420H allows the update of the tag and state memories to complete in cases where an update operation was initiated in stage 420G.

While each stage 420A-H is performing a portion of work on a received transaction in pipeline 410, stages 425A-H are also performing work in memory cache tag pipeline 415 on the same transaction. For example, in one embodiment, in stage 425A, the memory cache tag pipeline 415 sets up the address of the transaction to perform a lookup of the memory cache tags. In stage 425B, a lookup of the memory cache tags is performed using the address of the transaction. In stage 425C, the lookup of the memory cache tags completes. In stage 425D, memory cache tag pipeline 415 receives notification 430 from duplicate tag pipeline 410, wherein notification 430 specifies the hit or miss status and lock status of the lookup of the same transaction to duplicate tag pipeline 410. In stage 425E, if the lookup of the memory cache tags is a miss for the address of the transaction and the transaction will be allocated to the memory cache, then a new entry is allocated in the memory cache for the transaction. In stage 425E, memory cache tag pipeline 415 also receives notification 435 from duplicate tag pipeline 410. In stage 425F, memory cache tag pipeline 415 sends notification 440 with the allocation or no allocation decision to duplicate tag pipeline 410 which indicates if the transaction is able to pass the global ordering point. In stage 425G, if needed, an update to the memory cache tags is initiated. In stage 425H, the update to the memory cache tags completes.

In one embodiment, stages 420A and 425A are implemented in a first clock cycle (cycle 0), stages 420B and 425B are implemented in a second clock cycle (cycle 1), stages 420C and 425C are implemented in a third clock cycle (cycle 2), stages 420D and 425D are implemented in a fourth clock cycle (cycle 3), stages 420E and 425E are implemented in a fifth clock cycle (cycle 4), stages 420F and 425F are implemented in a sixth clock cycle (cycle 5), stages 420G and 425G are implemented in a seventh clock cycle (cycle 6), and stages 420H and 425H are implemented in a eighth clock cycle (cycle 7). In one embodiment, cycles 0-7 are consecutive clock cycles. It should be understood that the examples of pipelines 410 and 415 and the corresponding stages 420A-H and 425A-H are indicative of one particular embodiment. In other embodiments, the pipeline structure, number of stages, actions performed during individual stages, and information shared between pipelines may vary. Other techniques for implementing parallel lookup pipelines and sharing information between the parallel lookup pipelines are possible and are contemplated.

Figure 5:
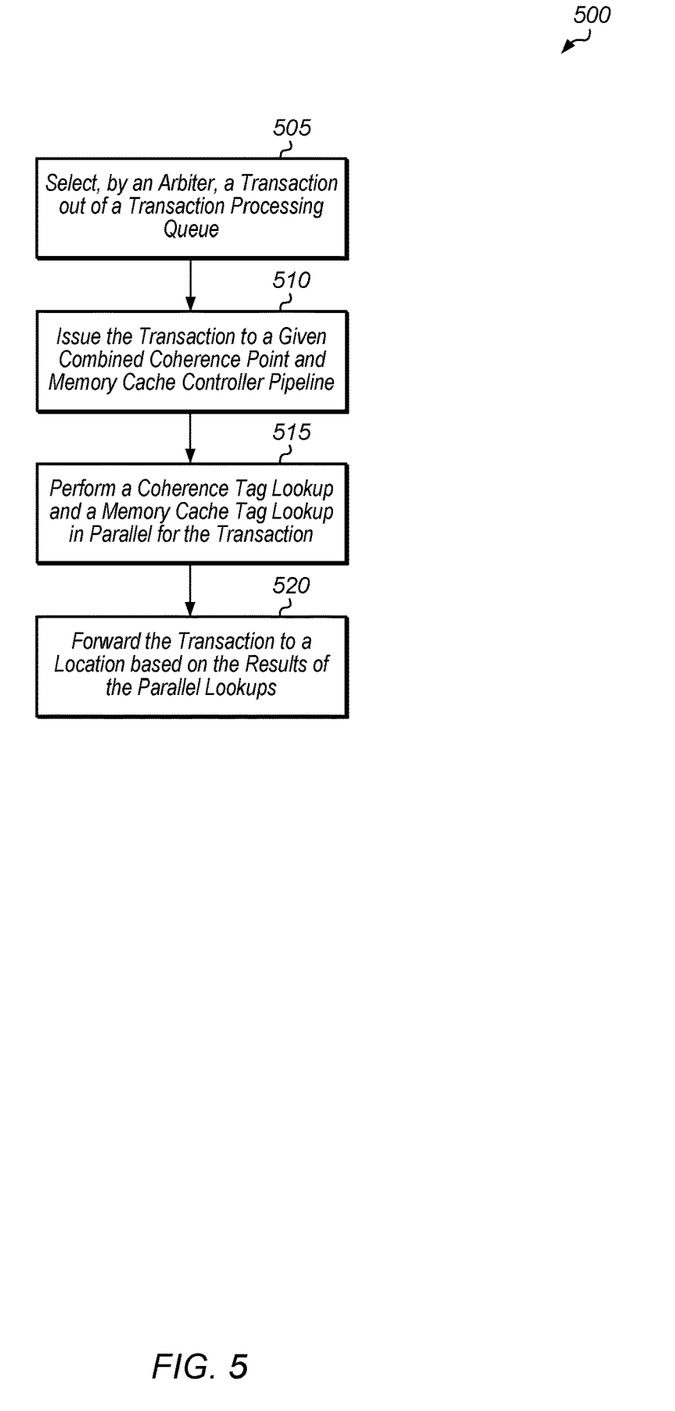
FIG. 5 is a generalized flow diagram illustrating one embodiment of a method for performing parallel coherence tag and memory cache tag lookups.

Referring now to FIG. 5, one embodiment of a method 500 for performing parallel coherence tag and memory cache tag lookups is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 500.

An arbiter selects a transaction out of a transaction processing queue (block 505). In one embodiment, the transaction is a memory transaction traveling upstream toward memory. Next, the arbiter issues the transaction to a given combined coherence point and memory cache controller pipeline (e.g., combined coherence point and memory cache controller pipeline 350A of FIG. 3) (block 510). Then, the pipeline performs a coherence tag lookup and a memory cache tag lookup in parallel for the transaction (block 515). Next, the pipeline forwards the transaction to a location based on the results of the parallel lookups (block 520). After block 520, method 500 ends.

Figure 6:
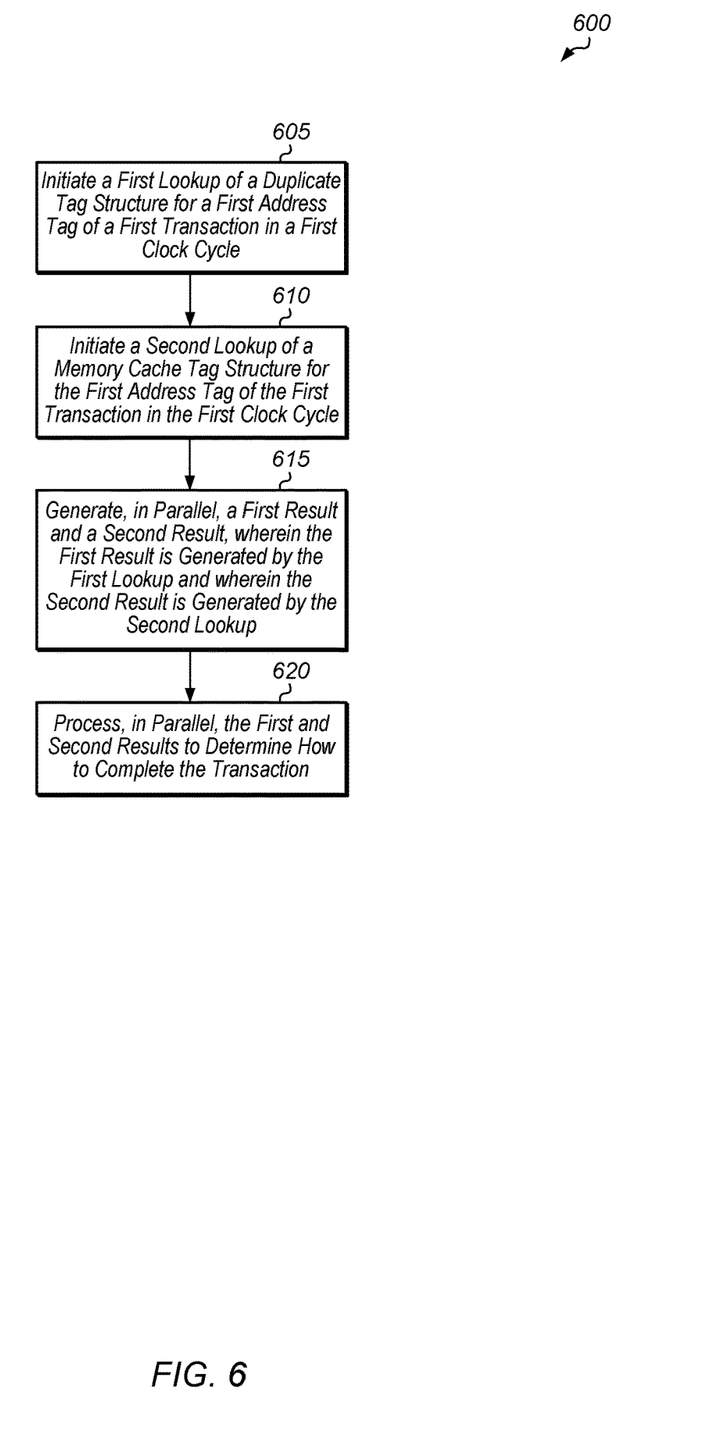
FIG. 6 is a generalized flow diagram illustrating another embodiment of a method for performing parallel coherence tag and memory cache tag lookups.

Turning now to FIG. 6, another embodiment of a method 600 for performing parallel coherence tag and memory cache tag lookups is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 600.

A pipeline (e.g., combined coherence point and memory cache controller pipeline 350A of FIG. 3) initiates a first lookup of a duplicate tag structure for a first address tag of a first transaction in a first clock cycle (block 605). In one embodiment, initiating the first lookup in the first clock cycle involves searching for a match to the first address tag in a tag field of the duplicate tag structure. The results of the first lookup may not be available until one or more clock cycles after the first clock cycle. Also, the pipeline initiates a second lookup of a memory cache tag structure for the first address tag of the first transaction in the first clock cycle (block 610). The results of the second lookup may not be available until one or more clock cycles after the first clock cycle.

Next, the pipeline generates, in parallel, a first result and a second result, wherein the first result is generated by the first lookup and wherein the second result is generated by the second lookup (block 615). Then, the pipeline processes the first and second results to determine how to complete the transaction (block 620). After block 620, method 600 ends. It is noted that method 600 may be performed for each transaction that is received by the pipeline. In one embodiment, the pipeline may generate results from a first transaction while simultaneously lookups are initiated for a second transaction, if the second transaction is targeting a different address than the first transaction.

Figure 7:
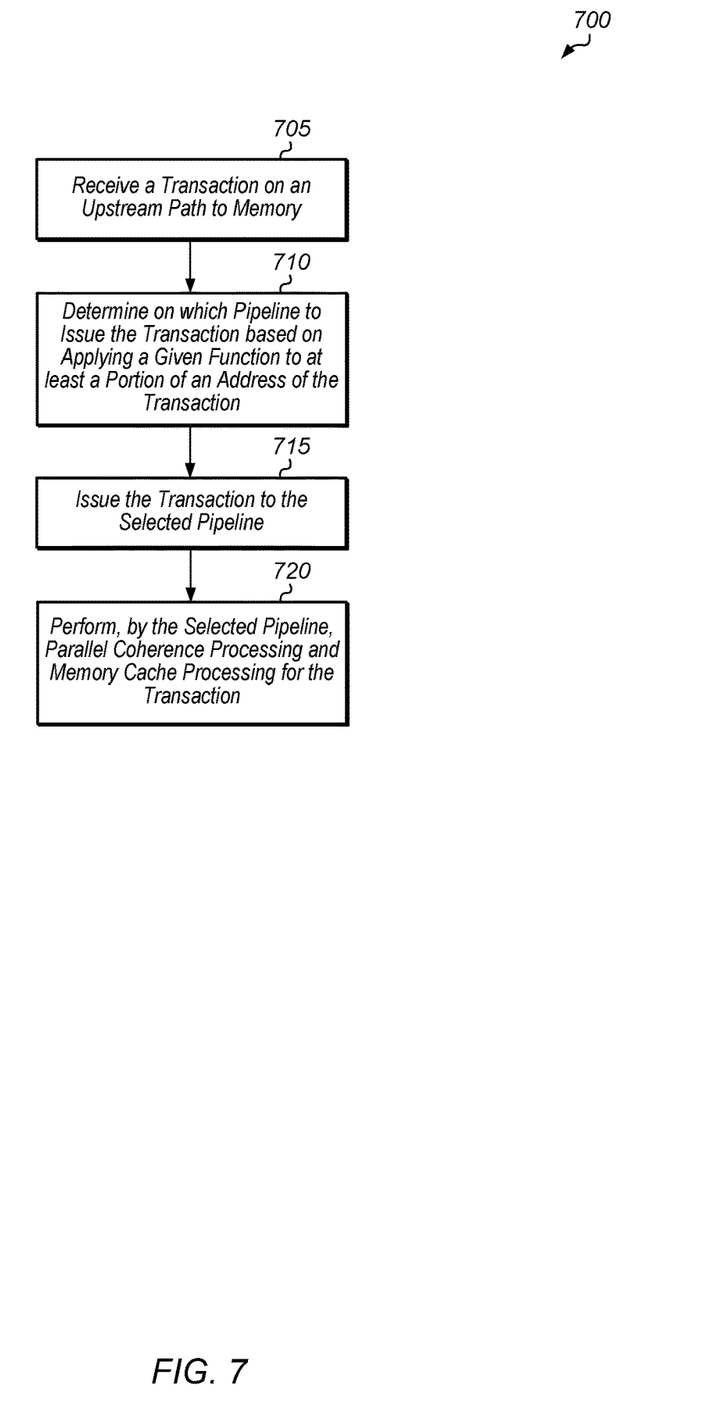
FIG. 7 is a generalized flow diagram illustrating one embodiment of a method for determining on which pipeline to issue a transaction.

Referring now to FIG. 7, one embodiment of a method 700 for determining on which pipeline to issue a transaction is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 700.

A communication fabric receives a transaction on an upstream path to memory (block 705). The communication fabric determines on which pipeline (of a plurality of combined coherence point and memory cache controller pipelines) to issue the transaction based on applying a given function to at least a portion of an address of the transaction (block 710). In one embodiment, the given function is a hash function. In other embodiments, other types of functions may be used to determine on which pipeline to issue the transaction. Next, the communication fabric issues the transaction to the selected pipeline (block 715). Then, the selected pipeline performs parallel coherence processing and memory cache processing for the transaction (block 720). After block 720, method 700 ends.

Figure 8:
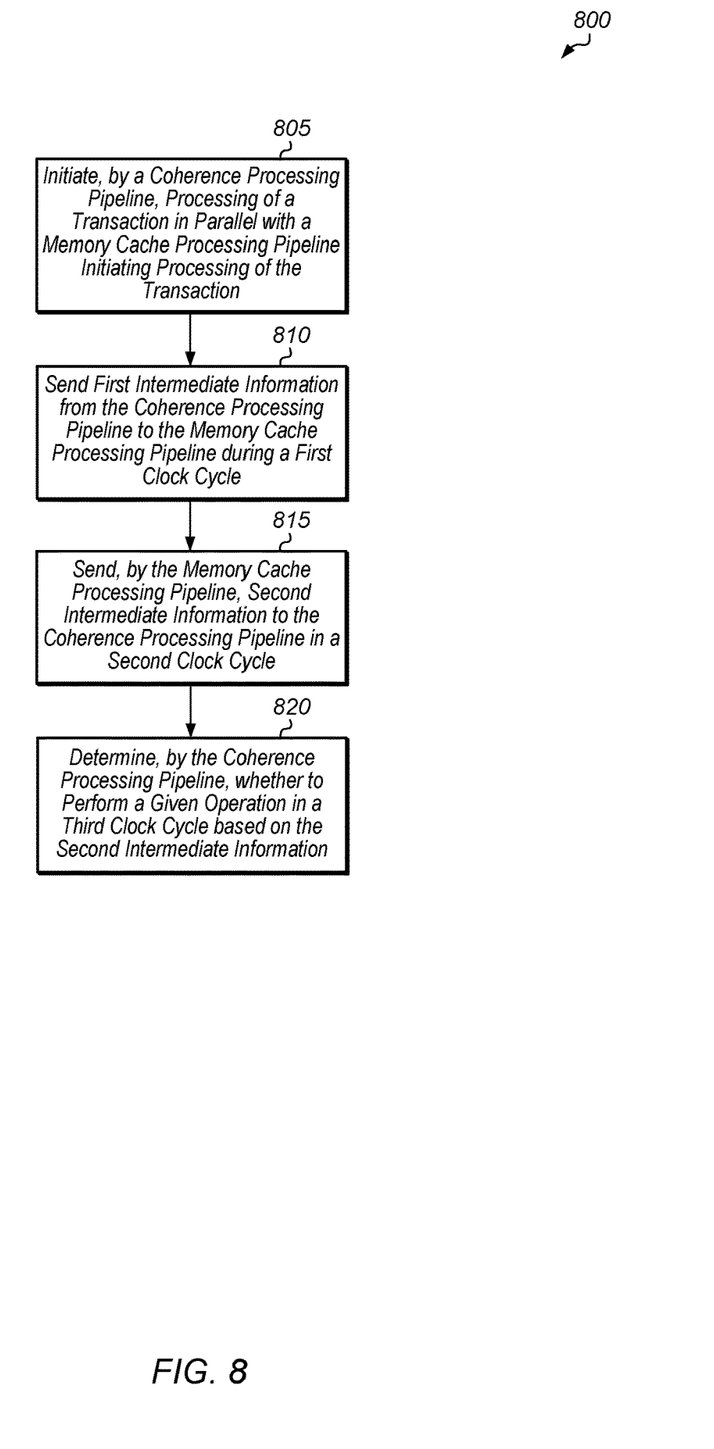
FIG. 8 is a generalized flow diagram illustrating one embodiment of a method for sharing information between parallel coherence processing and memory cache processing pipelines.

Turning now to FIG. 8, one embodiment of a method 800 for sharing information between parallel coherence processing and memory cache processing pipelines is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 800.

A coherence processing pipeline initiates processing of a transaction in parallel with a memory cache processing pipeline initiating processing of the transaction (block 805). During processing, the coherence processing pipeline sends first intermediate information (e.g., notification 430 of FIG. 4) to the memory cache processing pipeline during a first clock cycle (block 810). In one embodiment, the first intermediate information includes a hit/miss status and/or an indication if the coherence processing pipeline is going to lock a cache line if the memory cache processing pipeline indicates that the transaction has passed the global ordering point. In other embodiments, the first intermediate information includes other information.

Next, the memory cache processing pipeline sends second intermediate information (e.g., notification 440 of FIG. 4) to the coherence processing pipeline in a second clock cycle (block 815). In one embodiment, the second intermediate information includes an indication of whether the transaction has passed the global ordering point. In other embodiments, the second intermediate information includes other information. Also, in one embodiment, the second clock cycle is subsequent to the first clock cycle. Then, the coherence processing pipeline determines whether to perform a given operation in a third clock cycle based on the second intermediate information (block 820). In one embodiment, the given operation is writing new tag and state values to the tag and state memories. For example, in one embodiment, if the transaction has crossed the global ordering point, the coherence processing pipeline writes new tag and state values to the tag and state memories. In other embodiments, the given operation is any of various other types of operations. Also, in one embodiment, the third clock cycle is subsequent to the second clock cycle. After block 820, method 800 ends.

Figure 9:
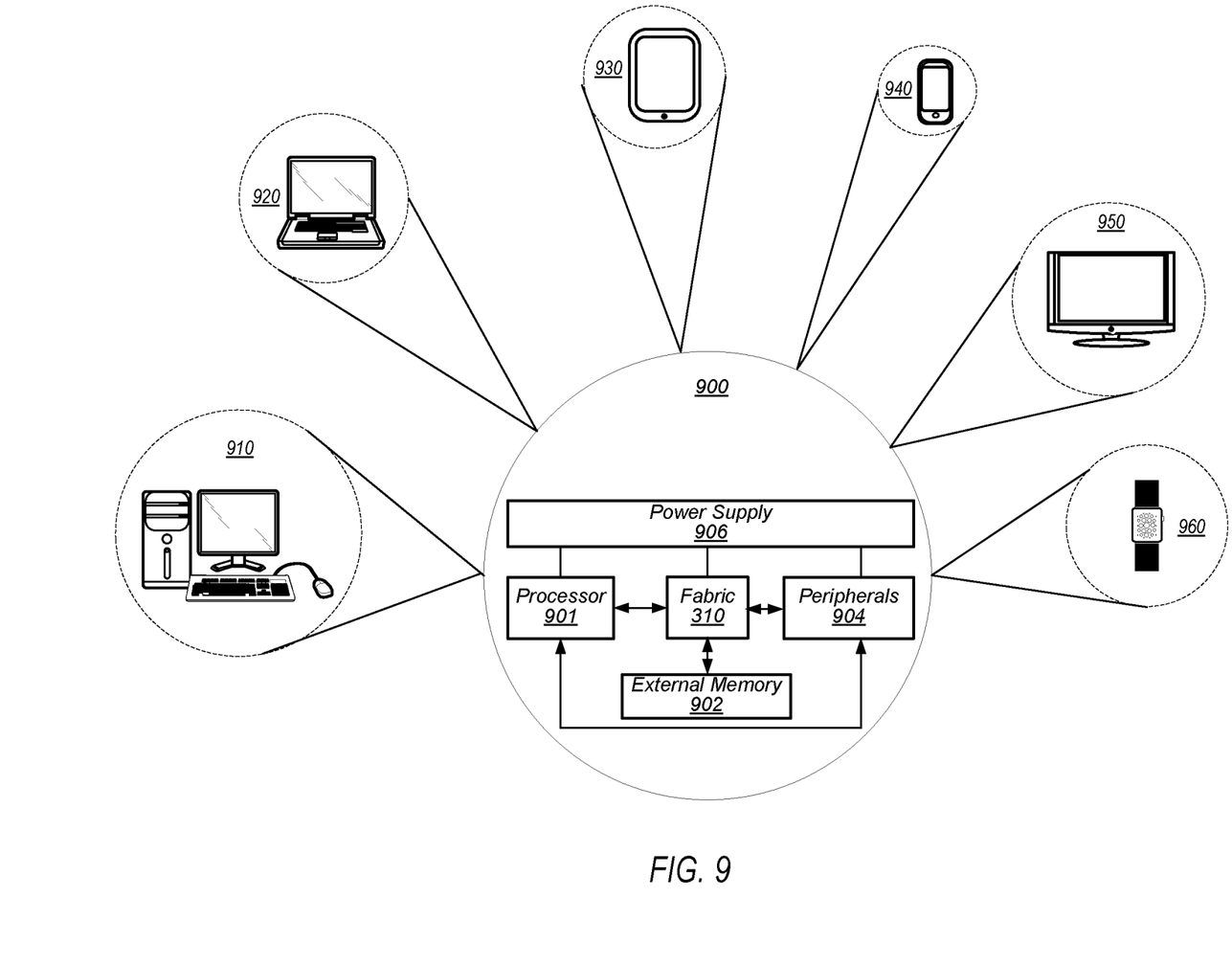
FIG. 9 is a block diagram of one embodiment of a system.

Referring next to FIG. 9, a block diagram of one embodiment of a system 900 is shown. As shown, system 900 may represent chip, circuitry, components, etc., of a desktop computer 910, laptop computer 920, tablet computer 930, cell or mobile phone 940, television 950 (or set top box configured to be coupled to a television), wrist watch or other wearable item 960, or otherwise. Other devices are possible and are contemplated. In the illustrated embodiment, the system 900 includes at least one instance of consolidated memory fabric 310 (of FIG. 3). In various embodiments, fabric 310 may be included within a system on chip (SoC) or integrated circuit (IC) which is coupled to processor 901, external memory 902, peripherals 904, and power supply 906.

Fabric 310 is coupled to processor 901, one or more peripherals 904, and the external memory 902. A power supply 906 is also provided which supplies the supply voltages to fabric 310 as well as one or more supply voltages to the processor 901, memory 902, and/or the peripherals 904. In various embodiments, power supply 906 may represent a battery (e.g., a rechargeable battery in a smart phone, laptop or tablet computer). In some embodiments, more than one instance of fabric 310 may be included (and more than one processor 901 and/or external memory 902 may be included as well).

The memory 902 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing fabric 310 in a chip-on-chip configuration, a package-on-package configuration, or a multi-chip module configuration.

The peripherals 904 may include any desired circuitry, depending on the type of system 900. For example, in one embodiment, peripherals 904 may include devices for various types of wireless communication, such as wifi, Bluetooth, cellular, global positioning system, etc. The peripherals 904 may also include additional storage, including RAM storage, solid state storage, or disk storage. The peripherals 904 may include user interface devices such as a display screen, including touch display screens or multi-touch display screens, keyboard or other input devices, microphones, speakers, etc.

Figure 10:
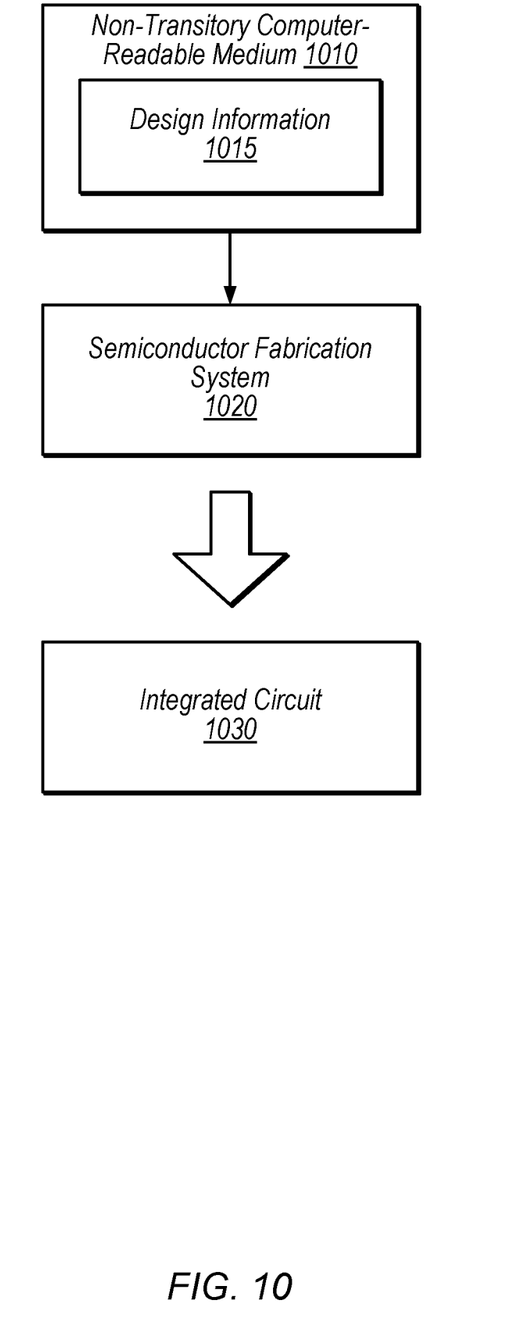
FIG. 10 is a block diagram illustrating an exemplary non-transitory computer-readable storage medium that stores circuit design information.

Turning now to FIG. 10, a block diagram illustrating an exemplary non-transitory computer-readable storage medium that stores circuit design information is shown. In the illustrated embodiment, semiconductor fabrication system 1020 is configured to process the design information 1015 stored on non-transitory computer-readable medium 1010 and fabricate integrated circuit 1030 based on the design information 1015.

Non-transitory computer-readable medium 1010 may comprise any of various appropriate types of memory devices or storage devices. Medium 1010 may be an installation medium, (e.g., a CD-ROM, floppy disks, or tape device) a computer system memory or random access memory (e.g., DRAM, DDR RAM, SRAM, EDO RAM, Rambus RAM), a non-volatile memory (e.g., a Flash, magnetic media, a hard drive, optical storage), registers, or other similar types of memory elements. Medium 1010 may include other types of non-transitory memory as well or combinations thereof. Medium 1010 may include two or more memory mediums which may reside in different locations (e.g., in different computer systems that are connected over a network).

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis and/or layout of integrated circuit 1030.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1-4. Furthermore, integrated circuit 1030 may be configured to perform various functions described herein in conjunction with other components. For example, integrated circuit 1030 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, program instructions of a software application are used to implement the methods and/or mechanisms described herein. For example, program instructions executable by a general or special purpose processor are contemplated. In various embodiments, such program instructions are represented by a high level programming language. In other embodiments, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of embodiments. Numerous variations and modifications will become apparent to those skilled in the art once the above disclosure is fully appreciated. It is intended that the following claims be interpreted to embrace all such variations and modifications.

What is claimed is:

1. A computing system comprising:
   one or more duplicate tag pipelines configured to store one or more address tags corresponding to data stored in one or more caches of one or more agents, wherein the one or more caches are between a coherence point and the one or more agents;
   one or more memory cache tag pipelines different from the one or more duplicate tag pipelines configured to store one or more address tags corresponding to data stored in a memory cache, wherein the memory cache is between the coherence point and one or more memory controllers of system memory; and
   circuitry configured to:
      receive a transaction being conveyed on an upstream path toward the system memory via the one or more memory controllers;
      initiate a first lookup using information included in the transaction in parallel with a second lookup different from the first lookup using information included in the transaction, wherein the first lookup is performed by a first duplicate tag pipeline of the one or more duplicate tag pipelines and wherein the second lookup is performed by a first memory cache tag pipeline of the one or more memory cache tag pipelines; and
      process a first result from the first lookup of the first duplicate tag pipeline in parallel with processing a second result from the second lookup of the first memory cache tag pipeline to determine how to complete the transaction.

2. The computing system as recited in claim 1, wherein the one or more duplicate tag pipelines track cache lines that are cached by the memory cache shared by coherent agents of the computing system.

3. The computing system as recited in claim 1, wherein the system further comprises a communication fabric coupled to the one or more processing units, coupled to the one or more memory controllers of the system memory and comprising the memory cache, wherein the communication fabric is configured to:
   receive the transaction on the upstream path to the system memory via the one or more memory controllers; and
   determine on which pipeline to issue the transaction based on applying a given function to at least a portion of an address of the transaction.

4. The computing system as recited in claim 3, wherein the given function is a hash function.

5. The computing system as recited in claim 1, wherein the first duplicate tag pipeline is configured to:
   convey first intermediate information to the first memory cache tag pipeline in a first clock cycle;
   receive second intermediate information from the first memory cache tag pipeline in a second clock cycle; and
   determine whether to perform a given operation in a third clock cycle based on the second intermediate information.

6. The computing system as recited in claim 5, wherein the first memory cache tag pipeline is configured to:
convey the second intermediate information to the first duplicate tag pipeline in the second clock cycle; and
receive the first intermediate information from the first duplicate tag pipeline in the first clock cycle.

7. The computing system as recited in claim 1, wherein the circuitry is further configured to:
perform, in a first clock cycle, the first lookup by the first duplicate tag pipeline using a tag of the transaction; and
perform, in the first clock cycle, the second lookup by the first memory cache tag pipeline using the tag of the transaction.

8. A method comprising:
receiving, by circuitry coupled to one or more duplicate tag pipelines configured to store one or more address tags corresponding to data stored in one or more caches of one or more agents, wherein the one or more caches are between a coherence point and the one or more agents and one or more memory cache tag pipelines different from the one or more duplicate tag pipelines configured to store one or more address tags corresponding to data stored in a memory cache, wherein the memory cache is between the coherence point and one or more memory controllers of system memory, a transaction being conveyed on an upstream path toward the system memory via the one or more memory controllers of a computing system;
initiating a first lookup using information included in the transaction in parallel with a second lookup different from the first lookup using information included in the transaction, wherein the first lookup is performed by a first duplicate tag pipeline of the one or more duplicate tag pipelines and wherein the second lookup is performed by a first memory cache tag pipeline of the one or more memory cache tag pipelines; and
processing a first result from the first lookup of the first duplicate tag pipeline in parallel with processing a second result from the second lookup of the first memory cache tag pipeline to determine how to complete the transaction.

9. The method as recited in claim 8, wherein the one or more duplicate tag pipelines track cache lines that are cached by the memory cache shared by coherent agents of the computing system.

10. The method as recited in claim 8, further comprising:
receiving, by a communication fabric coupled to the one or more processing units, coupled to the one or more memory controllers of the system memory and comprising the memory cache, the transaction on the upstream path to the system memory via the one or more memory controllers; and
determining on which pipeline to issue the transaction based on applying a given function to at least a portion of an address of the transaction.

11. The method as recited in claim 10, wherein the given function is a hash function.

12. The method as recited in claim 8, further comprising:
conveying, by the first duplicate tag pipeline, first intermediate information to the first memory cache tag pipeline in a first clock cycle during processing;
receiving second intermediate information from the first memory cache tag pipeline in a second clock cycle; and
determining whether to perform a given operation in a third clock cycle based on the second intermediate information.

13. The method as recited in claim 12, further comprising:
conveying, by the first memory cache tag pipeline, the second intermediate information to the first duplicate tag pipeline in the second clock cycle; and
receiving the first intermediate information from the first duplicate tag pipeline in the first clock cycle.

14. The method as recited in claim 8, further comprising:
performing, in a first clock cycle, the first lookup by the first duplicate tag pipeline using a tag of the transaction; and
performing, in the first clock cycle, the second lookup by the first memory cache tag pipeline using the tag of the transaction.

15. An apparatus comprising:
one or more processing units;
one or more dual-processing pipelines comprising:
a duplicate tag pipeline configured to store one or more address tags corresponding to data stored in one or more caches of one or more agents, wherein the one or more caches are between a coherence point and the one or more agents; and
a memory cache tag pipeline different from the duplicate tag pipeline configured to store one or more address tags corresponding to data stored in a memory cache, wherein the memory cache is between the coherence point and one or more memory controllers of system memory; and
circuitry configured to:
receive, via the communication fabric, a transaction, generated by a first processing unit, being conveyed on an upstream path toward the system memory via the one or more memory controllers;
initiate, on a first dual-processing pipeline, a duplicate tag lookup using information included in the transaction in parallel with a memory cache tag lookup different from the duplicate tag lookup using information included in the transaction; and
process a first result from the duplicate tag lookup in parallel with processing a second result from the memory cache tag lookup to determine how to complete the transaction.

16. The apparatus as recited in claim 15, wherein the duplicate tag lookup is performed to a duplicate tag structure which tracks cache lines that are cached by the memory cache shared by coherent agents of the apparatus.

17. The apparatus as recited in claim 15, wherein the apparatus further comprises a communication fabric coupled to the one or more processing units, coupled to the one or more memory controllers of the system memory and comprising the memory cache, wherein the communication fabric is configured to:
receive the transaction on the upstream path to the system memory via the one or more memory controllers; and
determine on which pipeline to issue the transaction based on applying a given function to at least a portion of an address of the transaction.

18. The apparatus as recited in claim 17, wherein the given function is a hash function.

19. The apparatus as recited in claim 15, wherein a duplicate tag pipeline, of the first dual-processing pipeline, is configured to:
convey first intermediate information to a memory cache tag pipeline, of the first dual-processing pipeline, in a first clock cycle during processing;
receive second intermediate information from the memory cache tag pipeline in a second clock cycle; and determine whether to perform a given operation in a third clock cycle based on the second intermediate information.

20. The apparatus as recited in claim 19, wherein the memory cache tag pipeline is configured to:
convey the second intermediate information to the duplicate tag pipeline in the second clock cycle; and
receive the first intermediate information from the duplicate tag pipeline in the first clock cycle.

* * * * *